Oct. 20, 1970     C. C. CAIN     3,535,009

DEVICE FOR MOVABLY MOUNTING CABINETS OR THE LIKE

Filed Feb. 17, 1969     2 Sheets-Sheet 1

Inventor
Chester C. Cain
By John F. Brezina
his Attorney

Oct. 20, 1970      C. C. CAIN      3,535,009
DEVICE FOR MOVABLY MOUNTING CABINETS OR THE LIKE
Filed Feb. 17, 1969      2 Sheets-Sheet 2
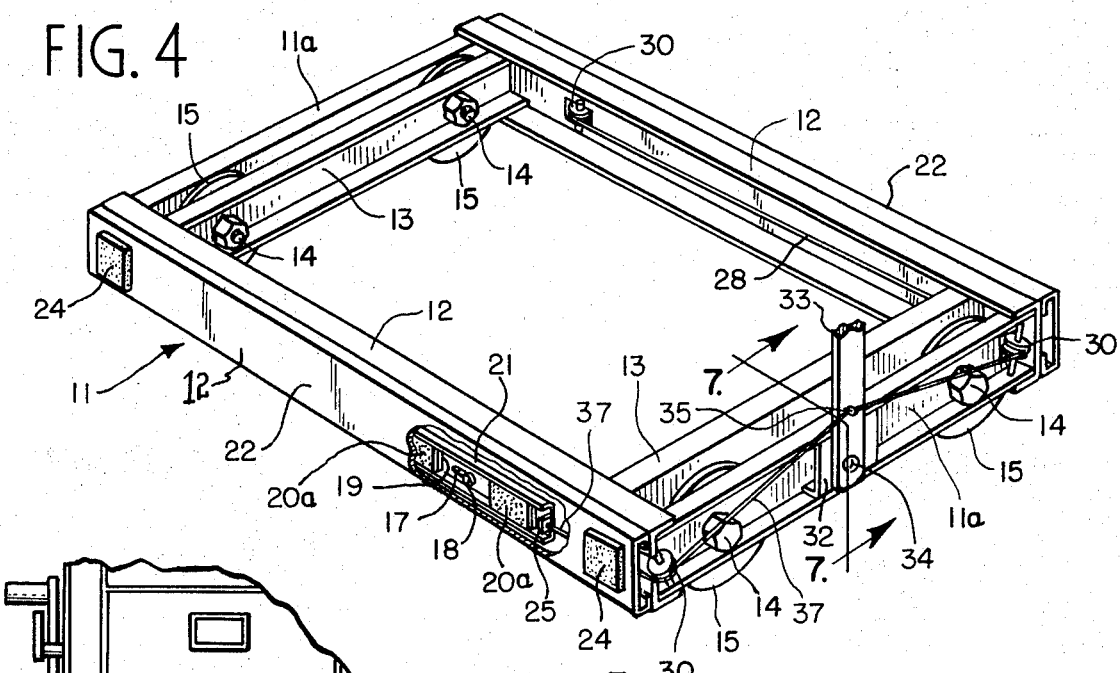
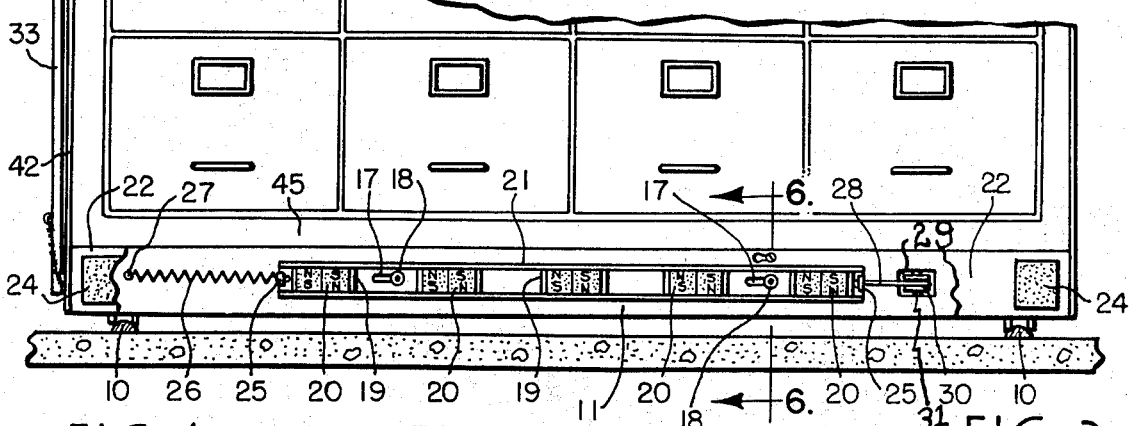
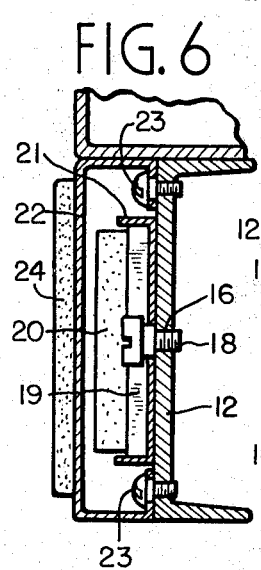
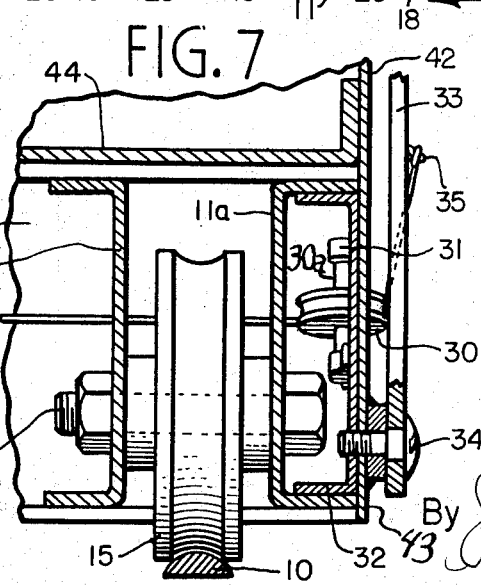
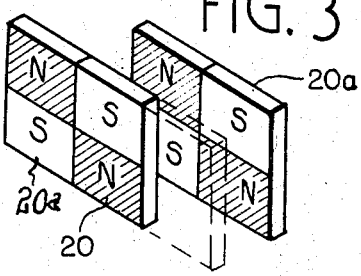
Inventor
Chester C. Cain
By John F. Bregma
His Attorney

United States Patent Office 3,535,009
Patented Oct. 20, 1970

3,535,009
DEVICE FOR MOVABLY MOUNTING CABINETS OR THE LIKE
Chester C. Cain, 1856 Sunnyside Circle,
Northbrook, Ill. 60062
Filed Feb. 17, 1969, Ser. No. 799,662
Int. Cl. A47b *53/00*
U.S. Cl. 312—199                                   7 Claims

ABSTRACT OF THE DISCLOSURE

The structural device and system for rollably mounting a plurality of movable storage units or cabinets in a restricted area; with selectively movable means on each cabinet carrying a plurality of spaced apart magnets, said means being adapted to selectively move a part of said magnets into and out of repulsion positions relative to other magnets on an adjacent movable support, and into and out of attraction positions relative to said opposed or adjacent magnets.

---

This invention is directed to a novel system and structural device or arrangement for rollably mounting a plurality of movable supports adapted to support storage or filing cabinets or units in a restricted area for the purpose of utilizing less floor space into positions wherein a part or most of cabinets are in adjacent positions and in positions normally obstructing manual access to any of said cabinets; and providing novel means including a plurality of magnets for assisting the selective manual movement of each of said cabinets or units and their rollable supporting means to separate one or more of said cabinets or units from others thereof to provide manual access to the interior of a selected cabinet or unit; and providing for selectively molding any two or more of said cabinets in immediately adjacent positions to permit utilization of substantially less floor space.

Objects and accomplishments of my invention are:

(a) To provide a space-saving device for movably mounting a plurality of filing or storage cabinets on a base of a pre-determined area supporting track means on said base, and a plurality of movable metal cabinet-supporting frames having roller means engaging said track means; having a plurality of longitudinally spaced block-like magnets mounted on each of a plurality of longitudinally movable bars movably carried on the side bars of said frames, and means for manually moving said movable bars and magnets therein into and out of "repulsion" positions relative to the magnets mounted on adjacent movable bars to facilitate rolling movement of each storage cabinet or unit successively by overcoming the normal cabinet or unit at rest, and relative to said base to selectively provide access for a person to the interiors of any of said cabinets.

(b) To provide a device and system for rollably mounting a plurality of storage cabinets in a restricted area having manually controlled means for mounting a plurality of spaced apart magnets on manually movable bars in positions to selectively move said movable magnets into and out of "repulsion" positions relative to magnets connected on an adjacent movable bar to thereby assist manual movement successively of each of said supported cabinets to provide any access aisle and permit selective manual access to the interior of any one of said cabinets.

(c) To provide a construction and device for supporting a plurality of separate movable frames on a base adapted to carry a plurality of storage cabinets thereon respectively; having means for assisting the manually actuated separating moving of each cabinet supporting frame successively relative to a common base, said means including a plurality of longitudinally spaced stationary magnets connected to slidable bars carried by said frames respectively; and manual means for selectively moving the respective slidable bars and their magnets to "repulsion" positions relative to each other, to thereby assist in manual movement to separate any one of said frames from the remainder thereof to provide access space to the interior of any desired cabinet carried on said frame.

(d) To provide a device for assisting the selective movement of rollably mounted frames adapted to carry storage cabinets from one position to other positions in a bank of substantially adjacent rollably supported cabinets a movable bar on the sides of each of said frames and a plurality of spaced apart magnets secured on each of said movable bars, and lever mechanisms for selectively moving said movable bars and movable magnets into "repulsion" positions, to permit relatively easier movement of one or more of each frame successively by overcoming the normally inertia of cabinets at rest and to cause a cabinet or unit on said frame to be moved to provide for manual access to the interior of the desired cabinet or unit.

Other important objects of my invention will be apparent from the following description and claims.

In the drawings:

FIG. 3 is an enlarged fragmentary view illustrating two of the typical magnetic metal carrying units in spaced-apart though substantially adjacent position.

FIG. 4 is a perspective view of one of the movable supporting frames having mounted thereon rollable means adapted to engage supporting rails.

FIG. 5 is a fragmentary elevation, with parts broken away, of one of the cabinet-supporting frames mounted on tracks, and showing fragments of a storage cabinet.

FIG. 6 is an enlarged cross-sectional view taken on a vertical plane indicated by line 6—6 of FIG. 5.

FIG. 7 is an enlarged cross-sectional view taken on a vertical plane indicated by lines 7—7, of FIG. 4.

As shown on the drawings:

Figure 1:
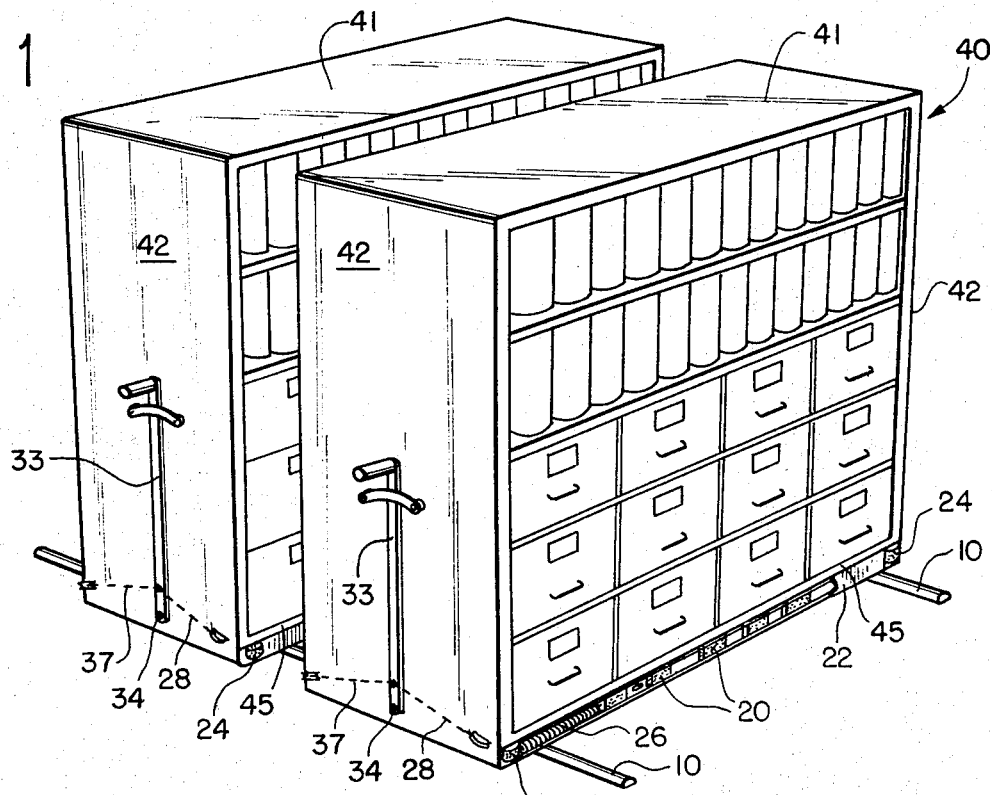
FIG. 1 is a perspective view of my invention illustrating a pair of enclosing shells having a plurality of cabinets or storage units therein and being rollably supported.
Figure 2:
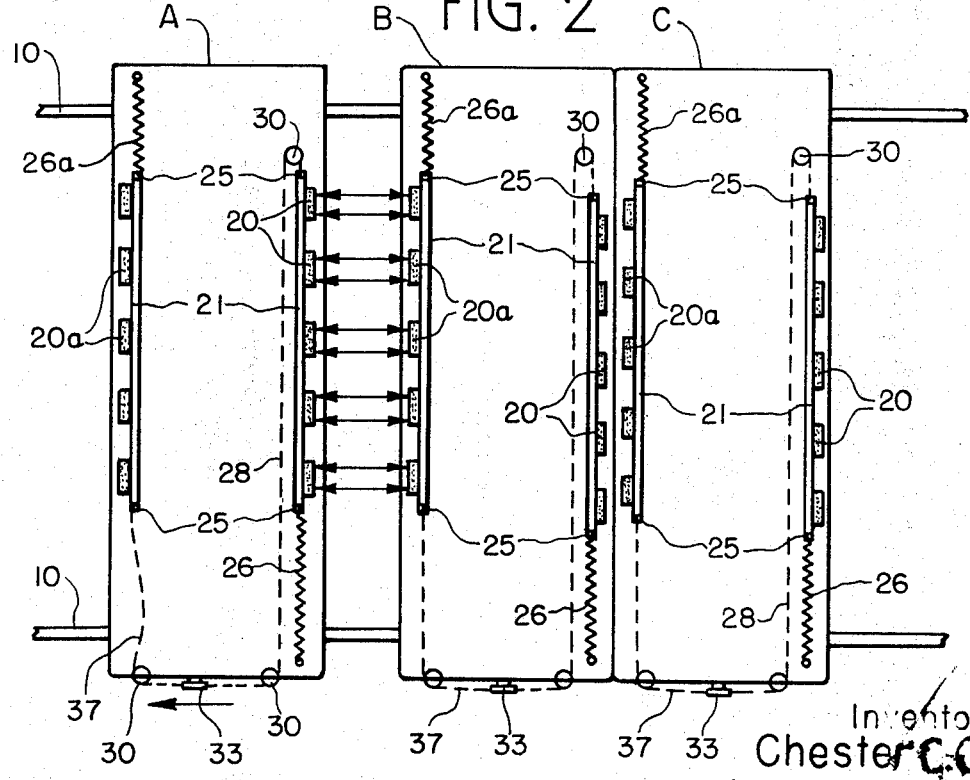
FIG. 2 is a top plan and diagrammatic view looking from above and showing three of the rollable casings or shells and showing portions of a plurality of cabinets movably supported on parallel rails, and illustrating certain positions of the magnet-carrying bars.

Referring to FIGS. 1 and 2, reference numeral 10 designates a pair of metal tracks or rails 10 which are mounted parallel to each other upon a floor or other flat supporting surface.

As partially illustrated in FIGS. 4 and 5, reference numeral 11 generally designates a rectangular metal frame which is formed by connecting together, preferably by welding, two metal end members 11a, and two relatively elongated side members 12, which are secured together to form a rectangular shaped frame as illustrated in FIG. 4. A pair of channel-like trusses or bars 13 are connected at their opposite ends, preferably by welding, to the side members of the frame and in inwardly spaced relation from the opposite end members 11.

Each end member 11a and the spaced connecting bar 13 inward thereon have formed therein two aligned holes which receive horizontal journalling bolts 14 respectively and which said bolts extend through central holes of externally grooved rollers or wheels 15, as illustrated in FIG. 4, wherein two of said wheels are journalled adjacent opposite ends of the said frame.

Said wheels are externally grooved and are adapted to ride upon tracks 10 respectively, which said tracks are of rounded arcuate form as illustrated, so that said frames and the units which they support would not be normally moved from engagement relative to said tracks, and as illustrated in FIG. 7.

The outer end members 11a of the said frame, illustrated in cross section in FIGS. 6 and 7, are preferably of channel-like cross section, and each thereof have a threaded aperture 16 formed in their mid portions.

Numerals 21 designate elongated channel-like bars which are of a length substantially less than the side portions of the frame F, and each of said bars have an elongated slot 17 therein which normally extends horizontally.

A bolt 18 extends through each of the slots 17 and has its threaded end threaded in a hole in each of the bars 12. Said bolts 18 provide means for sliding and guiding longitudinal movements of bars 21 and act to limit such movements.

On each of said bars 21 is mounted an elongated metal plate or bar 19, and securely mounted to the outer face of each of said elongated metal plates 19 on one side of each frame 11 are a plurality of spaced-apart magnets 20 which are spaced apart as illustrated in FIGS. 2 and 5. Similar magnets 20a are mounted spaced apart on the plates 19 on the other side of each frame 11. A part of said magnets are illustrated in FIG. 3 and in which two magnets 20 and 20a are mounted in edge to edge position, with their respective poles extending in opposite directions, as illustrated in FIG. 3.

Each elongated slotted flat magnet-mounting bar 19 is secured against the normally inside face of each of the slidable channel-like mounting members 21, as illustrated in FIG. 6, and the pluralities of magnets 20 and 20a are mounted in longitudinally uniformly spaced apart relation on the exposed flat face of each of the bars 19, and spaced apart as illustrated in FIG. 5.

As illustrated in FIG. 3, each set of magnets consist of a magnet 20 and of an adjacent magnet 20a, whose poles are positioned in opposite direction (up or down) so that horizontal movement thereof in one direction will place each pair of opposed magnets into position wherein the north and south poles of every alternate magnet are in opposed and attraction position as to the south and north poles of the nearest adjacent magnet on the adjacent movable frame, as illustrated in FIG. 3. Such attraction position is maintained when the frames F are in their close adjacent position.

When one of the movable bars 21 is moved longitudinally as herein described, the magnets on such bar are moved to positions with their respective poles into opposed corresponding positions in which there is repulsion between the opposing adjacent magnets.

Each of the bolts 18 have an annular shoulder as illustrated in FIG. 6 and it extends into the slot 17 to form a means for slidably mounting for longitudinal movement the movable mounting channels 21 which carry the movable magnet bars 19 with their respective spaced apart magnets 20 and 20a.

An elongated channel-like cover 22, preferably of stainless steel, is secured by screws 23 extending through apertures therein and end trusses or bars 12, as shown in FIGS. 5 and 6. Each of said shields or covers 22 have at least two yieldable rubber-like pads or bumpers 24 secured thereon, preferably by cement, to cushion the impact when any two of said carrying frames are moved into contact. Covers 22, being of stainless steel or equivalent material not affecting magnetic attraction, will not affect the attraction or repulsion between different magnets mounted on different mounting bars in slightly spaced apart parallel positions.

As shown in FIG. 5, each of the magnet carrying channel members 19 have angularly bent integral ears at their opposite ends to form anchoring hooks 25. To one hook 25 of each member 19, a stretchable spring 26 is connected, each of said springs 26 being also anchored to a projecting pin 27 on the channel 19, as illustrated at the left of FIG. 5. Each hook 25 at the opposite end of each said member 19 has anchored to it one end of a right hand flexible cable 28 which is movable mounted as hereinafter described and illustrated at the right side of each of the three frames shown in FIG. 2.

Each side truss bar 11 of each movable frame A, B and C, has a slot 29 formed therein, as shown in FIG. 5. A grooved pulley 30 having a stub shaft 30a is journalled on journalling blocks 31 which are suitably secured as by welding, on an inner channel-like mounting block 32 secured on end truss 11 as illustrated in FIG. 7.

As shown in FIGS. 1, 5 and 7, on each of the frames A, B, and C, a manually movable apertured metal lever 33 has its lower end pivoted by a screw 34 to a threaded aperture in mounting block 32. Said lever 33 normally extends upwardly, and one of the cables 28 is connected to and through an eyelet 35 secured in its intermediate portion as shown in FIG. 7.

As illustrated in FIG. 4 and in dotted line in FIG. 2, cable 28 movably engages the pulleys 30 and is connected to the end of one of the movable magnet-carrying channel members 21 so that movement of the lever 33 to the left will pull the magnet carrying bars 19 and 21, at the right of FIG. 2, toward the end of the base opposite the lever 33, and upward in FIG. 2, and to the right in FIG. 5 against the normal pulling action of the spring 26. This same lever movement will cause cable 37, connected to said lever 33, to become slack. The spring 26a, which is connected to the end of the other magnet-carrying bar of the opposite side of the same frame, will hold said left channel member 19 and bar 21 in the opposite direction, namely upward, in FIG. 2 and to the upper left in FIG. 4. The longitudinal movement of channel members 19 is limited by the engagement of screws 18 engaging the slots 17 (see FIG. 5).

Referring to FIGS. 1 and 2, numerals 40 designate outer metal rectangular outer shells or casings, each of which includes a horizontal connecting top wall 41 and a bottom wall 45, and spaced vertical metal connecting side walls 42 whose lower edges extend below and along the vertical outer faces of the movable frame as indicated at 43 in FIG. 7, and are suitably secured to said frames. A part of such securing means is the screw 34 passing through an aperture in said outer covering shell side walls 42, as shown in FIG. 7.

A fragment of a typical rectangular portable storage cabinet is shown in FIG. 7 and marked by numeral 44 as removably supported on one of the movable frames.

It is to be understood that either drawer type or open shelf type cabinets or storage units of varying sizes may optionally be removably mounted within the shell 40 within the limits of its connected top, side walls and bottom wall 45 and so that all of such units are either open or openable in a common direction.

Similarly, each rollable shell unit may be wholly or partially vacant and without any separate storage units and may be used as a storage platform or support for optional positioning therein of articles.

An important advantage is the setting of a number of supporting or storage units within a specific floor area on parallel floor or track rails and in positioning all of the holding shells or movable supporting units and any containers which may be supported therein and their cabinets into immediately adjacent positions, which eliminates all aisles except one or more than one aisle between either an end shell and the nearest inner shell. The term "shell" or supporting unit includes any platform type supporting unit such as a movable dolly. This permits a floor space of specific area to contain up to approximately ninety percent more supporting units or shells than could be contained in such area with each storage cabinet or unit spaced a normal distance from its nearest storage units to provide an access aisle between each of said units. Due to the high cost of rental of floor space in modern buildings, a very substantial saving in rental cost is attained and a much greater volume of stored articles or records are maintained for easy access in a given work area.

Referring to FIG. 2, the three movable frames are designated as A, B and C. Before movement of frame A, from a former position adjacent frame B, the lever 33 was moved to the left, looking at FIG. 2, and such movement caused the right cable 28 to be pulled to cause magnet-carrying bar to be moved longitudinally to position the spaced magnets 20 thereon in opposed "repulsion" positions and in substantial transverse alignment with the magnets 20 of the bar 19 on the closest side of frame B. The repulsion force between said respective sets of magnets makes it relatively easy and requires only a fraction of the normal force to push the frame A, and a cabinet thereon to roll it away from frame B and any cabinet thereon. Said lever movement to the left causes the left hand cable 37 to become slack, and the left bar 19 remains stationary in the position limited by a slot 17 and the screw therein.

Once the initial rolling movement is started, it requires only slight manual force to keep it rolling to the desired position to provide an access aisle between the respective cabinets A and B.

Similarly, to move the right hand bar 19 and its magnets to "repulsion" position, the lever 33 on said frame B is to be moved to the left, and bar 19 on the right hand side of cabinet B will be moved longitudinally to position the magnets carried by bar 19 into alignment and in "repulsion" position relative to the magnets 20 on the left slidable bar 19 of cabinet C. Thereupon, frame B and any cabinet or articles supported thereon can easily be moved away from frame C and any cabinet thereon, to provide an access aisle between said cabinets B and C.

When the respective magnets 20 on the substantially adjacent bars 19 of frames and cabinets B and C are in the non-aligned position illustrated at the right of FIG. 2, the north and south poles of the magnets of the two slidable adjacent bars are in opposite and adjacent positions to produce an attraction and holding tendency to aid in maintaining such adjacent frames B and C together. When levers are in neutral position, all the magnets are in "attraction" position due to the action of the connecting springs.

When a frame or cabinet is to be moved in a direction, as to the right looking at FIG. 2, the lever 33 on the frame C is moved to the right and in the direction of desired movement. This causes the moved cable to pull the bar 19 of the cabinet to be moved against the pull of spring 26a, to position the magnets on said bar 19 into "repulsion" position relative to the magnets on the movable bar of the adjacent cabinet.

The spring 26, shown as the lower spring in FIG. 2 causes the released lever 33 to return to neutral or central position. This spring impelled movement pulls the bar 19 and its magnets to "attraction" position relative to the magnets of the adjacent bar.

My invention, exemplified by the preferred illustrated form recited in the foregoing, provides a novel system and means for selectively moving one or more of a plurality of adjacent supported frames or units, which provides for movably mounting or supporting the greatly increased number of storage units within a specified area. The novel magnet means recited greatly reduces the amount of manual force needed to effect the desired movements of either one or of a number of supporting frames or units within a specific area by overcoming the inertial resistance of an object at rest.

While the foregoing specification sets forth the invention in specific terms, it is to be understood that numerous changes in the size or materials may be resorted to without departing from the spirit and scope of the invention as claimed hereinafter, and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a structural device for movably supporting a plurality of cabinets:
    parallel spaced apart rails securable on a rigid supporting base;
    a plurality of frames having spaced and aligned rollers adapted to engage said rails respectively, each of said frames being adapted to support a cabinet;
    a slidably mounted bar mounted horizontally along opposite sides of each of said frames;
    a plurality of spaced apart magnets mounted on each of said slidable bars; and
    a lever mechanism for sliding each of said bars longitudinally, the manual actuated slidable movement of each of said slidable bars and magnets carried thereon in one direction being adapted to position said movable magnets in "repulsion" positions relative to the magnets of an adjacent movable bar carried on a side portion of an adjacent frame to thereby assist the desired separating movement of one of said frames from an adjacent frame.

2. In a device for rollably supporting a plurality of storage cabinets as recited in claim 1, and wherein said lever mechanism includes flexible cables connected to said lever and each of said levers being pivoted on an end portion of each of said frames respectively, each of said cables being connected to an end portion of the adjacent slidable bars respectively;
    said movable magnets on said slidable bar being selectively positionable into positions in pole registry with the magnets on a bar of an adjacent frame, and movable into non-registry repulsion positions relative to the magnets on an adjacent slidable bar;
    said magnets, when in non-polar non-registry position being adapted to assist in separating the supported cabinet from the remainder thereof.

3. In a device for movably supporting a plurality of storage cabinets in a restricted area as recited in claim 2, wherein each of said slidable bars has a longitudinal slot and said frames having a stop bolt in each thereof partially projecting through the slot on an adjacent slidable bar to thereby limit the longitudinal movement of each of said bars.

4. In a device having a plurality of rollably movable frames adapted to support storage cabinets or the like:
    spaced apart parallel horizontal supported rails;
    a plurality of metal frames, each thereof being adapted to support one or more cabinets thereon;
    roller means journalled on each of said frames adapted to roll on said rails respectively;
    a movable bar slidably mounted on both of the opposite side portions of each of said frames;
    a plurality of magnets mounted in longitudinally spaced apart positions on each of said bars;
    one movable bar on each of said frames being selectively movable to position the magnets thereon to attraction or repulsion positions relative to the magnets of a normally adjacent bar mounted on an adjacent frame;
    lever mechanism pivoted on an end portion of each of said frames;
    cables operatively connecting each of said levers and the end portions of the two movable bars on the same frame, each of said group of magnets on a single bar, when moved to "repulsion" opposite pole positions, being adapted to aid manual separating movement of the frame carrying said magnets relative to an adjacent frame, to thereby provide for selective access to cabinets mounted on said frame.

5. A device as recited in claim 4, and wherein said roller means includes a pair of rollers, journalled at the opposite side portions of each said frame, and having means on each of said frames for limiting the longitudinal sliding movement of each of said movable bars and the magnets carried thereon.

6. A device as recited in claim 4, wherein each of said movable bars are connected to adjacent movable channel members, said members having slots therein and said metal frames having guide screws extending through each of said slots respectively to guide and to limit the longitudinal movement of each of said magnet-carrying bars and said channel members.

7. A device for movably mounting one or more cabinets or storage units as recited in claim 4, wherein each of said metal frames have spaced side bars connected by opposite end bars to form a rectangular frame;

and wherein said roller means include a pair of track-engageable rollers journalled on said end bars;

having elongated channel members movably mounted along said side members;

said magnets being carried on said channel members;

and having grooved pulleys journalled at the end portions of said frames for rollably guiding the movements of said cables.

References Cited

UNITED STATES PATENTS

| 3,080,204 | 3/1963 | Lindhgren | 312—199 |
| 3,198,592 | 8/1965 | Zippel | 312—198 |

FOREIGN PATENTS

| 696,130 | 2/1961 | Canada. |

PATRICK D. LAWSON, Primary Examiner